United States Patent [19]
Kiyotoki

[11] Patent Number: 5,156,197
[45] Date of Patent: Oct. 20, 1992

[54] FLOAT TYPE LIQUID LEVEL METER

[75] Inventor: Yoshihisa Kiyotoki, Hitachi, Japan

[73] Assignee: Hitachi, Ltd., Tokyo, Japan

[21] Appl. No.: 600,723

[22] Filed: Oct. 22, 1990

[30] Foreign Application Priority Data

Oct. 25, 1989 [JP] Japan .................. 1-278344
Jun. 15, 1990 [JP] Japan .................. 2-155192

[51] Int. Cl.⁵ .............................................. F16K 24/02
[52] U.S. Cl. .................... 141/95; 141/199;
141/212; 141/216; 141/229; 137/435
[58] Field of Search .............. 141/94, 95, 199-205,
141/212-214, 216, 220-224, 229, 303;
137/101.27, 165-168, 409, 424, 425, 426, 429,
434, 435, 450

[56] References Cited

U.S. PATENT DOCUMENTS

| | | | |
|---|---|---|---|
| 1,267,780 | 5/1918 | Lunde | 141/200 |
| 1,486,078 | 3/1924 | Dumont | 141/204 |
| 2,715,488 | 8/1955 | Conlon | 141/201 X |
| 3,123,106 | 3/1964 | Parhaniemi | 141/204 |
| 3,970,101 | 7/1976 | Wilson | 137/434 X |
| 4,464,796 | 3/1987 | Krause | 141/234 |
| 4,901,776 | 2/1990 | Attinello | 141/95 |

FOREIGN PATENT DOCUMENTS

| | | | |
|---|---|---|---|
| 57-10417 | 1/1982 | Japan . | |
| 1375560 | 2/1988 | U.S.S.R. | 141/199 |

*Primary Examiner*—Ernest G. Cusick
*Attorney, Agent, or Firm*—Antonelli, Terry, Stout & Kraus

[57] ABSTRACT

A float type liquid level meter is provided having an enhanced resistance against vibration transmitted from outside of the float type liquid level meter. The inventor obtained a finding that an external vibration is amplified with a connecting lever which is composing a part of the float type liquid level meter and a fluctuation of an output signal of the float type liquid level meter is proportional to the vibration of the connecting lever. An enhanced resistance against vibration is achieved by providing a connecting lever having a structure which prevents the connecting lever from generating vibration of a low order mode.

17 Claims, 5 Drawing Sheets

FLOAT TYPE LIQUID LEVEL METER

BACKGROUND OF THE INVENTION

The present invention relates to an apparatus for detecting a level of liquid in a liquid storage tank, and provides a float type liquid level meter comprising a connecting lever which has a structure to suppress a fluctuation of a liquid level signal.

In a conventional float type liquid level meter, a connecting lever connecting a float and an apparatus for detecting buoyancy is comprised of a solid rod of small diameter, having a lighter weight than the float and of sufficient strength to hold the float, aiming only to transmit changes in weight of the float and which changes depend on a liquid level to the apparatus for detecting buoyancy. Therefore, such methods to provide a countermeasure with elements other than a connecting lever itself as a method to insert the connecting lever into a guide tube without any contact and a method to furnish supporting arms, extended from a float toward an inside wall of a liquid storage tank etc., are used as a method to suppress and moderate effects of disturbance which are caused with a bending stress to the connecting lever by buoyancy, or with a lateral oscillation by liquid flow. Several float type liquid level meters according to prior art are exemplified in the publication, such as, Japanese Patent Application Laid-Open No. 57-10417.

An example of the prior art using a tubular rod as a connecting lever to transmit a change of liquid level is disclosed in the U.S. Pat. No. 4,646,796, but a float to detect a liquid level and the connecting rod move concurrently with a magnetic connection and the float and the connecting rod are not connected directly. Therefore, the U.S. Pat. No. 4,646,796 is different in composition of a liquid level meter from the present invention, in which a float type liquid level meter comprising a float, an apparatus to detect buoyancy of the float and to convert the buoyancy to a liquid level, and a connecting rod which connects the float and the apparatus to detect buoyancy is disclosed.

The prior art described above considers a disturbance caused by buoyancy and liquid flow but not that from an external vibration effected directly to the liquid level meter itself. Consequently, when a vibration is caused at a place where the liquid level meter is installed, the vibration is transmitted to the liquid level meter itself and a phenomenon causing the fluctuation of an output signal from the liquid level meter is generated in spite of the liquid level itself being kept stable.

As a countermeasure for the phenomenon, in the case of a liquid level regulating system in which a regulating valve is operated with a regulator which intakes an output signal from a liquid level meter, a method for using the regulator having a large time lag element is adopted in order to prevent a fluctuation of the output signal of the liquid level meter from effecting directly the liquid level regulating system. But, if the fluctuation of the output signal of the liquid level meter is suppressed, it is possible to use a regulator having a small time lag element and to respond quickly to a change of liquid level, and consequently, a performance of the liquid level regulating system is improved.

SUMMARY OF THE INVENTION

In view of an aspect described above, one of object of the present invention is to provide a float type liquid level meter wherein a fluctuation of an output signal is suppressed and a float type liquid level transmitter wherein a fluctuation of an output signal is suppressed.

Substantial structure of a connecting lever which is preferable to suppress a fluctuation of an output signal of a liquid level is any of a lever structure comprised with a hollowed body having a circular outer shape or a polygonal outer shape in a section which is transverse to a longitudinal axis of the connecting lever, a lever structure comprised with a solid rod having at least one enforcing blade on a circumferential surface of the rod along a longitudinal axis of the rod, and a lever structure comprised with a solid rod wherein at least one ring is inserted and fixed on the circumferential surface of the rod at least on one intermediate position of a longitudinal axis of the rod.

Similar results are obtained by applying a connecting lever having a structure to suppress a fluctuation of an output signal, as described above, to a float type liquid level transmitter comprising a float, a connecting lever, an apparatus for detecting buoyancy, and a transducer.

FIG. 1a is a partially cutaway view of a float type liquid level meter relating to the present invention. An operation theory of a float type liquid level meter will now be described with reference to FIG. 1a.

A float type liquid level meter is comprised with casings 2, 3, a float 4, a connecting lever 5, and an apparatus for detecting buoyancy 6 which measures an apparent weight of the float, converts the apparent weight to a liquid level and outputs a signal of the liquid level. A lower casing 3 is connected to a structure which is a target to detect a liquid level with connecting pipes 7, and according to a theory of a connecting pipe, a liquid level in the structure which is a target to detect a liquid level is revealed inside of the lower casing 3.

The float 4 is a hollow vessel and is connected to the apparatus for detecting buoyancy 6 with the connecting lever 5. In a case that liquid level is zero, the apparatus for detecting buoyancy measures weight of the float itself and converts the weight of the float itself to a liquid level, and a signal $\epsilon_0$ is output as an indication of the liquid level is zero. In a case in which the liquid level is higher than a bottom line of the float by L, a buoyancy expressed by an equation ($\gamma LS$), where $\gamma$ is a specific gravity of a liquid and S is an area of a cross section of the float, of the float 4, results and an apparent weight of the float 4 expressed by an equation (W-$\gamma LS$) is transmitted to the apparatus for detecting buoyancy wherein a signal $\epsilon_0 - \Delta \epsilon$, where $\Delta \epsilon$ is a displacement equivalent to the buoyancy, is output and a liquid level L is indicated.

With a float type liquid level meter which is operated on a theoretical base described above, an operation of a connecting lever having a structure to suppress fluctuation of an output signal related to the present invention is described in the following.

A connecting lever of a conventional float type liquid level meter has a simple structure, a solid rod with a small diameter, in aiming of only transmission of an apparent weight of a float which changes depending on a liquid level to the apparatus for detecting buoyancy. The conventional float type liquid level meter of such a structure has a phenomenon under an operation in which a liquid level output signal fluctuates in spite of the liquid level being kept at a stable condition. An investigation of a cause of such a fluctuation reveals that the fluctuation is induced with vibrations which are transmitted from outside of the apparatus for detecting buoyancy to casings and the connecting lever, wherein the vibrations are amplified by self-excitation, and a combination of a buoyancy and the amplified vibration is transmitted to the apparatus for detecting buoyancy and induces the fluctuation.

An external vibration transmitted to a connecting lever through a casing induces vibrations like a string as shown in FIG. 2 to the connecting lever. Vibrations of a string changes at random such as first mode, second mode, third mode, and so on, and amplitude of vibrations of a string are also changed. Therefore, even though frequency of generating fluctuation and strength of fluctuation change at random, a fluctuation having the maximum output power is generated with the first mode vibration of the connecting lever. If energies of external vibrations which are transmitted to the casing have a same value, a relation between the amplitude of vibration of the connecting lever V and natural frequency of vibration f is expressed with an equation $V \propto 1/f$ as shown by a theory of vibration of a string. And, a relation between the amplitude of vibration of the connecting lever V and strength of fluctuation a is determined to be proportional, to each other by experiments, and the relation is expressed with equations, $a \propto V \propto 1/f$, that is a $\propto 1/f$. Accordingly, as the strength of fluctuation a is proportional to a reciprocal number, 1/f, of the natural frequency of vibration of the connecting lever f, the strength of fluctuation a becomes less by making a structure of the connecting lever to be a structure having a large natural frequency of vibration f, that means the fluctuation of output from a float type liquid level meter is suppressed.

Natural frequency of vibration f of a connecting lever is expressed by a following equation (Japanese Society of Mechanical Engineers: JSME Mechanical Engineers' Handbook Revised 5th Edition, page 3-49, 1968) as the equation for a transverse vibration of a rod having a relatively small constant sectional area along a longitudinal axis.

$$f \doteq (\lambda^2/2\pi l^2) \sqrt{EIg/\gamma A} \quad (1)$$

where,
f: Natural frequency of a connecting lever
λ: Coefficient of frequency of vibration (First mode $\pi/\pi$, second mode $3\pi/2 \ldots$)
l: Length
E: Young's modulus
γ: Weight of a unit volume
A: Cross section
I: Secondary moment of the cross section Based on the equation described above, four methods described hereinafter are understood to be effective to make natural frequency of a connecting lever larger and to suppress fluctuation of an output signal of a float type liquid level meter.

a) To shorten a length of a connecting lever
b) To enlarge a shape factor, I/A, of a connecting lever
c) To avoid vibrations of low order mode
d) To use substance having a large substance factor, E/γ, as materials for a connecting lever Structures of a connecting lever described hereinafter are effective to embody the method described a) A connecting lever having a structure which a) A connecting lever having a structure which enables the length of the connecting lever, l, to be as short as possible in consideration of a shape of a target structure to detect liquid level, a position where an apparatus for detecting liquid level is installed, liquid level of a target liquid, and an environmental condition such as corrosive atmosphere etc.

b) Further, a structure of a connecting lever which is comprised with a hollowed body having a large diameter and thin wall thickness in order to make the shape factor, I/A, of the connecting rod large. Shapes of a transverse cross section to a longitudinal axis of the hollowed body are preferably a ring and a hollowed polygon, etc.. Examples of the structure relating to the present invention are illustrated in FIG. 3b, 3d, 3e, 3f, and 3g with a prior art in FIG. 3a and 3c. FIG. 3a is an illustration showing a connecting lever 5 and a float 4 of prior art, and the shape of the cross section of the connecting lever 5 at A—A position in FIG. 3a is a circle with small diameter as shown in FIG. 3c. FIG. 3b is an illustration showing a float 4 and a connecting lever 5 which has a structure relating to the present invention, and the shape of the cross section of the connecting lever 5 at A'-A' position in FIG. 3b is a ring (or ring-like) as shown in FIG. 3d or a hollowed square as shown in FIG. 3e.

c) As another measure to increase rigidity of the connecting lever and to enlarge a value of the shape factor, I/A, a structure of a connecting lever having fin shape enforcing blades along the longitudinal axis on the circumferential surface of the connecting lever, and a structure of a connecting lever of which transverse cross section to the longitudinal axis of the connecting lever is cruciform shape. Examples of the structures described above are shown in FIG. 3f and FIG. 3g, respectively.

d) A structure of a connecting lever having rings which are fixed on the circumferential surface of the connecting lever at intermediate positions of the longitudinal axis of the connecting lever is effective to avoid low order vibration of the connecting lever. Especially, with making the number of rings one or two, a place where the ring is fixed comprises a node to suppress first mode vibration, and consequently, a fluctuation having the maximum output induced by first mode vibration is prevented. One of the examples of the structure described above is shown in FIG. 4a and FIG. 4b. FIG. 4a is an illustration of a connecting lever 5 and a float 4 showing a fixed position of a ring, and FIG. 4b is a longitudinal cross section of a part designated as 4b in FIG. 4a to show the detail of the ring fixation. In the example described above, the maximum output is induced with second mode vibration having a wave length, a half of which equals ⅔ of total length of the connecting lever, and first mode vibration is suppressed.

e) Substances having a large substance factor defined as E/γ are preferable as materials for a connecting lever, but in view of industrial use, a property of corrosion resistance of materials to environmental substances existing in the target structure to be detected the liquid level is considered at first and substances having good corrosion resistance to the environmental substances are selected, and later, it is necessary to select materials for the connecting lever in view of large substance factor from the substances having good corrosion resistance. A connecting lever which is preferable for suppressing fluctuations is obtained by composing the connecting lever having a structure described above in a) to d) with materials selected as described in e).

All of the structures of the connecting lever described in a) to e) are the structure to make the natural frequency f of the connecting lever large, and any of the structures has an effect to suppress fluctuations based on a relation that the strength a of fluctuation is proportional to the reciprocal number of natural frequency f of the connecting lever.

DETAILED DESCRIPTION OF PREFERRED EMBODIMENTS

Example 1

One of the embodiments of the present invention is described in detail referring to from FIG. 5 to FIG. 7b.

Figure 5:
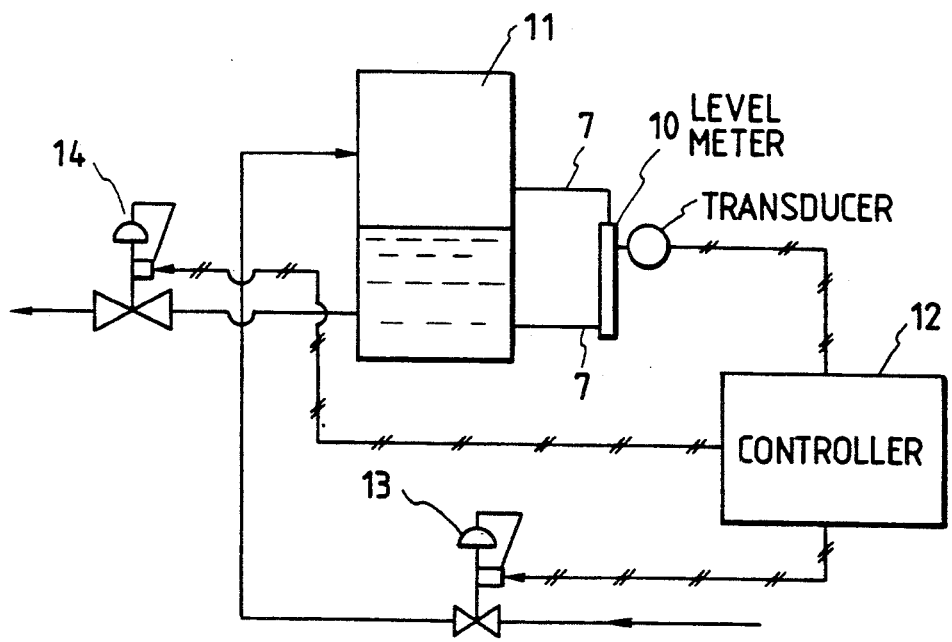
FIG. 5 is a schematic block diagram showing an embodiment of a water level regulating system using a float type liquid level meter according to the present invention.

FIG. 5 is a schematic block diagram showing an embodiment of a water level regulating system of a storage tank using a float type liquid level meter relating to the present invention. A float type liquid level meter 10 is connected to a storage tank 11 with connecting pipes 7. Based on an output from the float type level meter, a controller 12 controls an inlet regulating valve 13 and an exit regulating valve 14 to maintain water level in the storage tank constant.

Figure 6A:
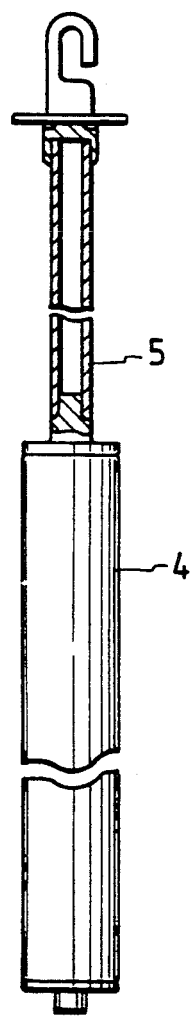
FIG. 6a is a partially cutaway view of a connecting lever and a float according to the present invention.
Figure 6B:
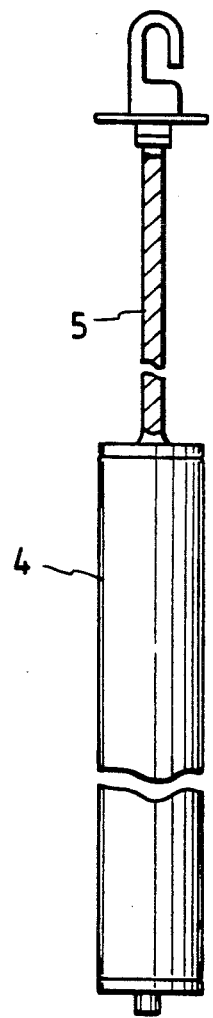
FIG. 6b is a partially cutaway view of a connecting lever and a float according to the prior art.
Figure 7A:
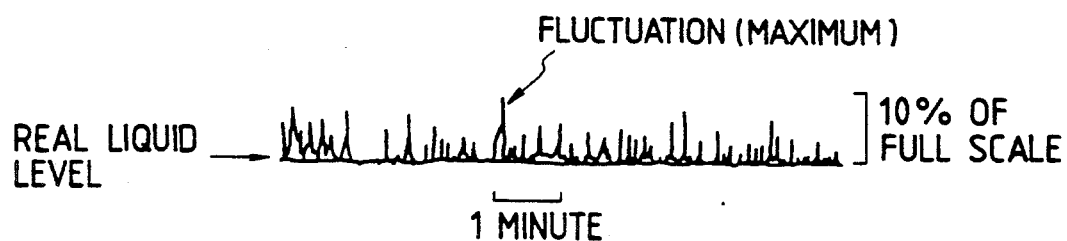
FIG. 7a is a recording chart of a liquid level detection showing an example of a liquid level detection of a water separator according to the prior art.

FIG. 6b is a partially cutaway view showing a structure of a conventional connecting lever and a float used in a liquid level meter of prior art which is installed on a water separator in an electric generating turbine plant. Total length of the connecting lever from an upper supporting point which is connected to an apparatus for detecting buoyancy to a bottom base line of the float is determined depending on a distance from a position where the liquid level meter is installed to a liquid level. The connecting lever is comprised with a stainless steel solid rod having 280 mm in total length and 5 mm in diameter, but values of the length and the diameter of the connecting rod are described as one of examples of prior art and are not to be any limitation of the present invention. A result of a liquid level detection using a liquid level meter having the conventional connecting lever 5 and the float 4 is shown in FIG. 7a as an example of prior art. Referring to FIG. 7a, where passing time is shown in a horizontal axis and liquid level detecting values are shown in a vertical axis as real liquid level is put as a base line. There are many fluctuations in the liquid level detecting values and the maximum fluctuation is recognized as ranging to about 10% of full scale in a period shown in the FIG. 7a.

On the other hand, FIG. 6a is an illustration of a float 4 and a connecting lever 5 using in a liquid level meter related to the present invention which is used at the same place and under the same condition as the liquid level meter of prior art described before. Referring to FIG. 6a, the outer diameter and the length of the float 4, and the total length from the upper supporting point to the bottom line of the float are the values determined with a premise that the liquid level meter is used at the same place and under the same condition as the liquid level meter of prior art which is described above, and same values as the example of prior art shown in FIG. 6b, but the feature of the present embodiment lies in a structure of the connecting lever 5. That is, the total length of the connecting lever 5 of the embodiment is same, 280 mm, as the total length of the connecting lever of prior art described above because the connecting lever of the embodiment is used at a same position of the connecting lever of prior art, but a structure of the connecting lever of the embodiment is a cylinder having 13.8 mm in outer diameter and 9.4 mm in inner diameter in contrast with the connecting lever of prior art which is comprised with a solid rod having 5 mm in diameter.

By using a cylinder for a connecting lever, a shape factor in the embodiment, that is a value of a secondary moment of a cross section, I, divided with an area of the cross section, A, becomes 17.43 mm$^2$, and the value equals almost eleven times of a shape factor, 1.56, of the conventional connecting lever described above. Consequently, a natural frequency of the connecting lever, f, becomes larger by almost three times, and hence, a strength of fluctuation, a, decreases to less than one third of the fluctuation of the example of the conventional liquid level meter based on a relation, $a \propto 1/f$.

Figure 7B:
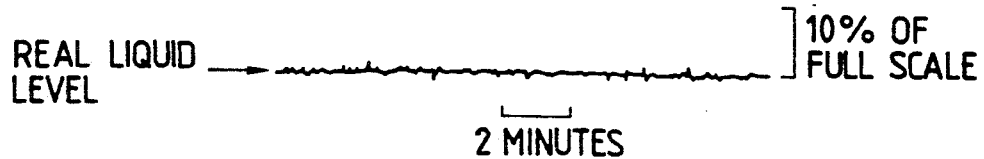
FIG. 7b is a recording chart of a liquid level detection showing an example of a liquid level detection of a water separator relating to one of the embodiments of the present invention.

The effect described above was confirmed with a practical use of a float type liquid level meter related to the present invention. A recording chart of a liquid level of a water separator determined with a float type liquid level meter having a connecting lever 5 related to the present invention and a float 4 used at the same position and under the same condition as a conventional float type liquid level meter is shown in FIG. 7b as designated as a present invention. Referring to FIG. 7b, a horizontal axis shows time passing at liquid level determination, and a vertical axis shows liquid level detecting values as real liquid level is put as a base line.

In comparing with the recording chart of an conventional level meter of prior art shown in FIG. 7a, a liquid level detecting values shown in FIG. 7b are very stable, and the strength of fluctuation decreases to about 2% of full scale, that is, about ⅛ to ¼ of the example of prior art. The result of a practical use described above reveals that an effect of the present invention to suppress a strength of fluctuation is obvious.

Example 2

Another embodiment of the present invention is described referring to FIG. 2, FIG. 4a, FIG. 4b, FIG. 6a, and FIG. 6b.

Figure 4A:
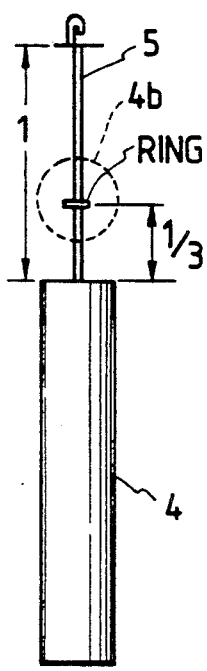
FIG. 4a is an illustration of a connecting lever and a float related to one of embodiments of the present invention to show a fixed position of a ring.
Figure 4B:
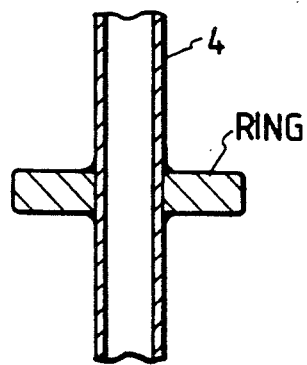
FIG. 4b is a longitudinal cross section of a part designated as 4b in FIG. 4a to show the detail of the ring fixation.

FIG. 4a is an illustration showing a composition of a float 4 and a connecting lever 5 (for example, an elongated hollowed body) which has a structure to suppress large fluctuations by inserting and fixing of ring bodies on circumferential surface of the connecting lever at intermediate positions for avoiding first mode of vibration of the connecting lever, and FIG. 4b is a longitudinal section illustrating an examples of a fixing status of a ring body on a circumferential surface of the connecting lever.

With FIG. 6b, an example of embodiments wherein the present invention is applied to a conventional connecting lever 5 is described in the following.

Figure 1A:
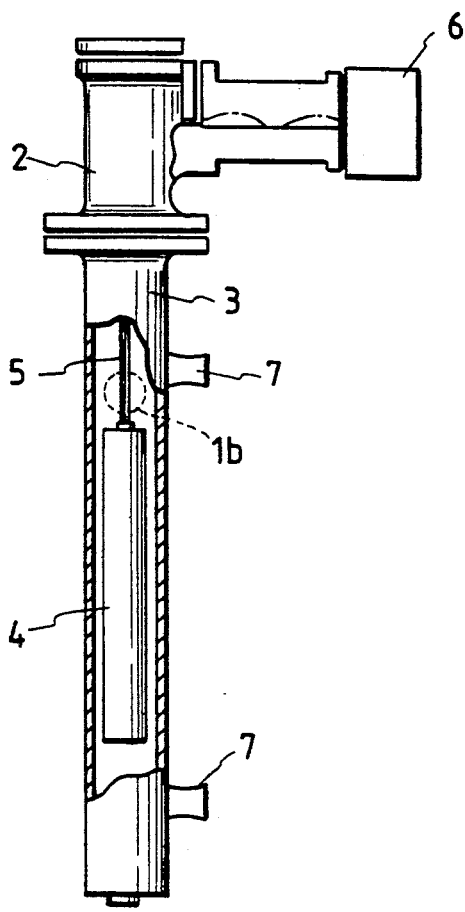
FIG. 1a is an illustration of a float type liquid level meter related to an embodiment of the present invention.
Figure 1B:
FIG. 1b is a partially cutaway section showing the detail structure of a part designated as 1b in FIG. 1a, FIG. 2 is a conceptual view showing generic vibration mode of a connecting lever.
Figure 2:
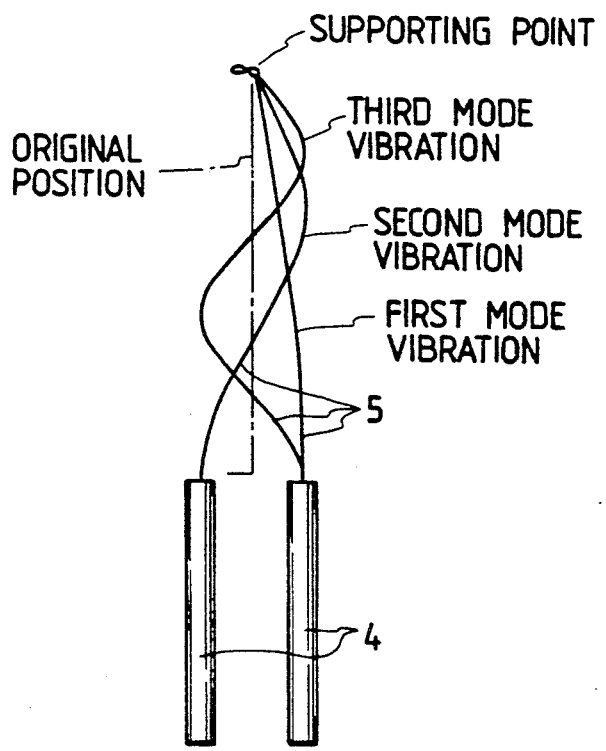
Figure 3A:
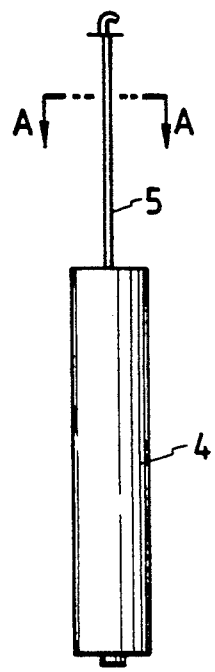
FIG. 3a is an illustration showing a connecting lever and a float according to the prior art.
Figure 3B:
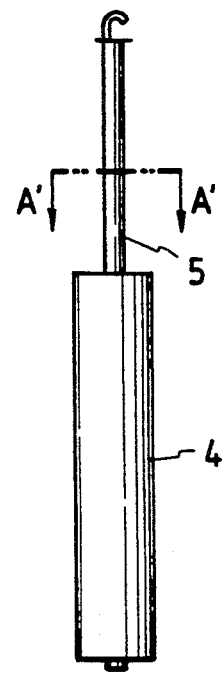
FIG. 3b is an illustration showing a float and a connecting lever which has a structure relating to the present invention.
Figure 3C:
FIG. 3c is a transverse section of the connecting lever according to the prior art.
Figure 3D:
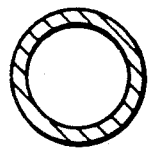
FIG. 3d is a transverse section of a connecting lever showing one of the embodiments of the present invention.
Figure 3E:
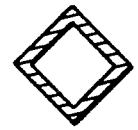
FIG. 3e is a transverse section of a connecting lever showing one of the embodiments of the present invention.
Figure 3F:
FIG. 3f is a transverse section of a connecting lever showing one of the embodiments of the present invention.
Figure 3G:
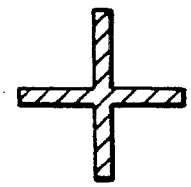
FIG. 3g is a transverse section of a connecting lever showing one of the embodiments of the present invention.

The conventional connecting lever 5 is comprised with a solid rod having 5 mm in diameter and 280 mm in length, and the connecting lever vibrates with modes of a several orders as shown in FIG. 2 when the connecting lever vibrates with one end supporting at a point connected to an apparatus for detecting buoyancy. Among vibrations, the vibration of the first order mode causes a maximum fluctuation in a detecting signal of liquid level, and hence, it is important to eliminate the vibration of the first order mode in aiming to suppress fluctuation in the output signal of liquid level. Therefore, a connecting lever relating to the present invention is comprised with inserting a steel ring having 18 mm in outer diameter, 5.2 mm in inner diameter, and 6 mm in thickness on a circumferential surface of the connecting lever and fixing with welding at a place where it is 93 mm upward from the connecting point of the float and the connecting lever, that is, a position of ⅓ of the total length of the connecting lever. When vibration is transmitted to the connecting lever having the structure described above, an inertia of the weighted ring causes making a node at the place where the ring fixed and the connecting lever vibrates with vibration modes of higher than the second order mode, and the first order vibration is excluded. Consequently, large fluctuations which is caused by the vibration of the first order mode is suppressed, and an effect to obtain stable output signals of the liquid level is obvious.

Depending on the present invention, fluctuation in liquid level output signals of a float type liquid level meter is suppressed. An example of embodiments shows that the fluctuation in liquid level output signals of a float type liquid level meter relating to the present invention decreases to about 1/10 of the fluctuation obtained with a conventional float type liquid level meter of prior art, and stable output signals indicating liquid level are obtained. Consequently, a detection of liquid level becomes more precise and, in a case using a float type liquid level meter relating to the present invention or a float type liquid level transmitter relating to the present invention in a liquid level regulating system, it becomes possible to set a time lag element small because of the stability of the output signals, and a response of the regulating system to a change of liquid level becomes fast and a performance of the liquid level regulating system is improved.

The improvement described above brings an obvious effect to increase a total reliability and a total stability of a various plants which adopt a float type liquid level meter related to the present invention and a float type liquid level transmitter related to the present invention.

What is claimed is:

1. A float type liquid level meter comprising:
   a float;
   an apparatus for detecting buoyancy of said float, converting the buoyancy to a liquid level and outputting a signal indicative of the liquid level; and
   a connecting lever which connects said float and the apparatus for detecting buoyancy and converting the buoyancy to a liquid level, said connecting lever and said float being disposed in a single casing,
   wherein said connecting lever is characterized as having a structure to suppress fluctuation of output signals provided by said apparatus indicative of the liquid level and for connecting the float and the apparatus for detecting buoyancy and converting the buoyancy to a liquid level, wherein said connecting lever is normally spaced from an inner wall of said casing.

2. A float type liquid level meter according to claim 1,
   wherein said connecting lever is comprised of an elongated hollowed body in which a transverse section with respect to a longitudinal axis thereof includes one of a ring-like and hollowed polygon shape.

3. A float type liquid level meter according to claim 1,
   wherein said connecting lever is comprised of an elongated body having one of at least one fin shape enforcing blade on an outer circumferential surface along a longitudinal axis thereof and that of an elongated body having a cruciform shape in a transverse section with respect to the longitudinal axes thereof.

4. A float type liquid level meter according to claim 1, further comprising:
   a ring body which is inserted and fixed on an outer circumferential surface of said connecting lever at an intermediate position of a longitudinal axis thereof.

5. A float type liquid level transmitter characterized in
   being comprised with said connecting lever having a same structure as a float type liquid level meter according to any one of claims 1 to 4.

6. A float type liquid level meter as claimed in claim 1, further including:
   ring bodies which are inserted and fixed on an outer circumferential surface of said connecting lever on at least two intermediate positions of a longitudinal axis thereof.

7. A float type liquid level meter according to claim 6, wherein said connecting lever is an elongated body.

8. A float type liquid level meter according to claim 6, wherein said connecting lever is an elongated hollowed body.

9. A float type liquid level meter according to claim 4, wherein said connecting lever is an elongated body.

10. A float type liquid level meter according to claim 4, wherein said connecting lever is an elongated hollowed body.

11. A float type liquid level meter according to claim 1, wherein said connecting lever is comprised of an elongated hollowed body in which a transverse section with respect to a longitudinal axis thereof includes a ring-like shape.

12. A float type liquid level meter according to claim 1, wherein said connecting lever is comprised of an elongated hollowed body in which a transverse section with respect to a longitudinal axis thereof includes a polygon shape.

13. A float type liquid level meter according to claim 12, wherein said polygon shape is a square shape.

14. A float type liquid level meter according to claim 1, wherein said connecting lever is comprised of an elongated cylindrically-shaped body having at least one fin shape enforcing blade on an outer circumferential surface along a longitudinal axis thereof.

15. A float type liquid level meter according to claim 14, wherein said at least one fin shape enforcing blade includes four blades equally spaced-apart on the outer circumferential surface of said connecting lever and are respectively directioned in parallel to the direction of the longitudinal axis of said connecting lever.

16. A float type liquid level meter according to claim 1, wherein said connecting lever is comprised of an elongated body having a cruciform shape in a transverse section with respect to a longitudinal axis thereof.

17. A float type liquid level meter according to claim 4, wherein said ring body is disposed at a location on said connecting lever at about ⅓ its length from an end thereof corresponding to the location of mounting contact with said float.

* * * * *